(12) United States Patent
Orr

(10) Patent No.: US 7,327,845 B1
(45) Date of Patent: Feb. 5, 2008

(54) TRANSMISSION OF ENCRYPTED MESSAGES BETWEEN A TRANSMITTER AND A RECEIVER UTILIZING A ONE-TIME CRYPTOGRAPHIC PAD

(75) Inventor: David E. Orr, Vancouver, WA (US)

(73) Assignee: Xtendwave, Inc., Dallas, TX (US)

( * ) Notice: Subject to any disclaimer, the term of this patent is extended or adjusted under 35 U.S.C. 154(b) by 538 days.

(21) Appl. No.: 10/717,168

(22) Filed: Nov. 18, 2003

(51) Int. Cl.
 *H04K 1/00* (2006.01)

(52) U.S. Cl. .................. 380/270; 380/255; 455/39; 455/73; 367/76; 367/117

(58) Field of Classification Search ........... 380/270, 380/258, 33, 248, 273, 255; 455/24, 29, 455/69, 70, 73, 78, 83, 500, 411, 39; 340/318, 340/426.1; 375/219, 358; 398/22, 128; 713/163; 367/76, 117
See application file for complete search history.

(56) References Cited

U.S. PATENT DOCUMENTS

| | | | | |
|---|---|---|---|---|
| 5,266,942 A | * | 11/1993 | Stoller | 340/5.74 |
| 5,862,171 A | * | 1/1999 | Mahany | 375/132 |
| 2002/0132585 A1 | * | 9/2002 | Palermo et al. | 455/41 |

* cited by examiner

Primary Examiner—T. B. Truong
(74) Attorney, Agent, or Firm—Stanley Gradisar; Merchant & Gould PC

(57) ABSTRACT

An apparatus and method is disclosed for establishing a one-time cryptographic pad between a communicating pair, a communicating pair comprising a pair of transmitter-receivers, each of the pair having a plurality of cryptographic devices in common. The communicating pair also store previously exchanged messages and transmissions, a transmission comprising secure data exchanged by the pair that is independent of message content. The first transmitter-receiver randomly selects a cryptographic device and a previous transmission or message that has been sent to the second transmitter-receiver. The first transmitter-receiver also randomly selects a reference to a message or transmission previously sent by the second transmitter-receiver. The first transmitter-receiver encrypts the previously sent transmission or message and the reference to the message or transmission previously sent by the second transmitter-receiver and sends to the second transmitter-receiver. The second transmitter-receiver discovers the encryption device used by the first transmitter-receiver, verifies the message or transmission sent by the first transmitter-receiver, and uses the decrypted reference to access the previously sent transmission or message, then uses the discovered encryption device to encrypt the previously sent transmission or message and sends to the first transmitter-receiver. The first transmitter-receiver decrypts the transmission or message previously sent by the second transmitter-receiver, and authenticates. If authentication is successful, the first transmitter-receiver encrypts using the randomly selected cryptographic device.

12 Claims, 4 Drawing Sheets

TRANSMISSION OF ENCRYPTED MESSAGES BETWEEN A TRANSMITTER AND A RECEIVER UTILIZING A ONE-TIME CRYPTOGRAPHIC PAD

FIELD OF THE INVENTION

The invention is related to the field of security; more specifically the invention relates to a system and method for implementing a one-time cryptographic pad between a transmitter and a receiver.

BACKGROUND

All public key crypto-systems, such as PGP and RSA are not theoretically secure, they are only said to be computationally secure. The security of such systems depends on the following problem:

Given a number N, which has only two factors p1 and p2, both prime numbers, $N=p1*p2$ with $p1$ and $p2$ prime, it is computationally difficult (time consuming) to calculate p1 or p2. Essentially, there is always a way to break this code by just guessing p1, and subsequently dividing N by p1. If the result is another prime number (in this case p2), the code has been broken. Of course it's very difficult to guess p1, because N is normally very large, but if a general algorithm is developed for efficient factorization of any large number, then as a consequence RSA, PGP and other similar public key crypto-systems will become useless.

An additional problem with traditional public key encryption systems is the computational requirements for computing and applying keys. For large keys the computational load can be quite onerous even on a fast personal computer. For hand-held devices having a CPU, such as wireless communications devices, the computational load imposed by even moderate key sizes can be prohibitive.

Public key crypto-systems currently depend on an institution—the trusted authority—that distributes some information vital to the whole system. If this institution is not secure, the whole system is not secure. So, the security of all cryptographic exchanges ultimately depends upon the trustworthiness of the trusted authority.

In cryptography, a one-time pad is a system in which a randomly generated secret key is used only once to encrypt a message that is then decrypted by the receiver using a matching one-time pad and key. Messages encrypted with keys based on randomness have the advantage that there is theoretically no way to "break the code" by analyzing a succession of messages. Each encryption is unique and bears no relation to the next encryption so that some pattern can be detected. With a one-time pad, however, the decrypting party must have access to the same key used to encrypt the message and this raises the problem of how to get the key to the decrypting party safely or how to keep both keys secure. One-time pads have sometimes been used when the both parties started out at the same physical location and then separated, each with knowledge of the keys in the one-time pad. The key used in a one-time pad is called a secret key because if it is revealed, the messages encrypted with it can easily be deciphered. One-time pads figured prominently in secret message transmission and espionage before and during World War II and in the Cold War era. On the Internet, the difficulty of securely controlling secret keys led to the invention of public key cryptography.

Typically, a one-time pad is created by generating a string of characters or numbers that will be at least as long as the longest message that may be sent. This string of values is generated in some random fashion—for example, by using a computer program with a random number generator. The values are written down on an electronic pad or database and are distributed to any device that may be likely to send or receive a message. In general, a pad may be issued by a trusted authority as a collection of keys, one for each day in a month, for example, with one key expiring at the end of each day or as soon as it has been used once.

When a message is to be sent, the sender uses the secret key to encrypt each character, one at a time. If a computer is used, each bit in the character (which is usually eight bits in length) is exclusively "OR'ed" with the corresponding bit in the secret key. (With a one-time pad, the encryption algorithm may be implemented simply by using the XOR operation.) Where there is some concern about how truly random the key is, it is sometimes combined with another algorithm such as MD5. This kind of encryption can be thought of as a "100% noise source" used to mask the message. Only the sender and receiver have the means to remove the noise. Once the one-time pad is used, it can't be reused. If it is reused, someone who intercepts multiple messages can begin to compare them for similar coding for words that may possibly occur in both messages.

However, the one-time pad system suffers from the same problem as public key crypto-systems in that a trusted authority must be established to secure and distribute pads.

SUMMARY

Accordingly, a security apparatus and method for implementing a one-time cryptographic pad is disclosed for use by a telecommunication system communicating pair, the communicating pair comprising a first transmitter-receiver and a second transmitter-receiver, the apparatus having devices for sending cryptographic messages from the first transmitter-receiver to the second transmitter-receiver to be decrypted by the second transmitter-receiver, the apparatus comprising: (a) a first storage device in the first transmitter-receiver for storing messages and previous transmissions, or parts thereof, the messages or transmissions previously sent to and received from the second transmitter-receiver of the pair; (b) a second storage device for storing transmissions and messages or parts thereof, the transmissions and messages previously sent to and received from the first transmitter-receiver of the pair; (c) a plurality of cryptographic devices in the first transmitter-receiver, each of the cryptographic devices having a reference known to the first transmitter-receiver; (d) the same plurality of cryptographic devices with references also known to the second transmitter-receiver; (e) a selection device in the first transmitter-receiver for selecting and retrieving a transmission or message or a part thereof previously sent to the second transmitter-receiver; (f) a state computation device in the first transmitter-receiver for computing a random number as a function of a reference over one of the plurality of cryptographic devices known to the communicating pair, the function also being over a previous transmission or message sent to the second transmitter-receiver, the set of states known to the communicating pair; (g) a message sending device in the first transmitter-receiver for creating and sending a message to the second transmitter-receiver, the message containing the a previously sent transmission or message, or some part thereof, sent by the first transmitter receiver, and a reference to a transmission or message previously sent to the first transmitter-receiver by the second transmitter-receiver, the message sending device further encrypting the message using a cryptographic device randomly selected by the first transmitter-receiver; (h) a message receiving device in the second transmitter-receiver for receiving the message sent by the first transmitter-receiver, the message receiving device also extracting the encrypted previous transmission or message or part thereof sent by the first transmitter-receiver, and further extracting the reference sent by the first transmitter-receiver; (i) a cryptographic device reference decoder in the second transmitter-receiver for discovering the reference to the cryptographic device randomly selected by the first transmitter-receiver; (j) a reference decoding device in the second transmitter-receiver for controlling the cryptographic device associated with the reference discovered by the cryptographic reference decoder, the cryptographic decoding device applying the referenced cryptographic device to decrypt the previous transmission or message or part thereof sent by the first transmitter-receiver and to decrypt the reference to a transmission or message previously sent by the second transmitter receiver; (k) a message selection device in the second transmitter-receiver for selecting a previous transmission or message or a part thereof, stored in the second storage device, and for encrypting the transmission or message or a part thereof, selected, the message or part thereof encrypted using the encryption device associated with the reference discovered, and for sending the encrypted selected message or part thereof to the first transmitter-receiver; (l) a confirmation device in the first transmitter-receiver for confirming the correct reference was found by the second transmitter-receiver, and for confirming the correct transmission message previously sent by the second transmitter-receiver, the confirmation device using the cryptographic device associated with the cryptographic device reference sent to the second transmitter-receiver to decrypt the encrypted selected transmission or message sent by the second transmitter-receiver, and to evaluate the contents of the decrypted selected transmission or message sent by the second transmitter-receiver and to signal confirmation of no-confirmation; whereby the first transmitter-receiver, when sending an encrypted message to the second transmitter-receiver: (a) randomly selects an encryption device associated with a reference, and randomly selects a reference to a transmission or message previously received from the second transmitter-receiver; (b) using the randomly selected cryptographic device encrypts the previous transmission or message sent by the first transmitter-receiver and the reference to a previously sent by the second transmitter-receiver; (c) sends the encrypted message to the second transmitter-receiver; (d) the second transmitter-receiver discovers the cryptographic device randomly selected by the first transmitter-receiver and discovers the reference to the previous message sent; (e) the second transmitter-receiver using the discovered encryption device encrypts the referenced transmission or message or some part thereof sent to the first transmitter-receiver, and sends the encrypted referenced transmission or message or part thereof the first transmitter-receiver; and, (f) the first transmitter-receiver confirms the correctness of the contents of the encrypted message sent by the second transmitter-receiver and confirms the security of a transmission to the second transmitter-receiver.

The invention is seen to have a number of objects and advantages. The first object and advantage is that the invention implements a one-time pad between communicating pairs. The advantages and security benefits of a one-time pad are well-known.

A second advantage is that by using the state computation device with information known only to the communicating pair, the state computation device causing the cryptographic synchronization of the communicating pair, traditional cryptographic security can be made exponentially more difficult to break.

These advantages plus other advantages and benefits will be seen from reading of the detailed description and drawings that follow.

DETAILED DESCRIPTION

An Environment for Practicing the Invention

The invention is practiced by a communicating pair, the communicating pair comprising a first transmitter-receiver and a second transmitter-receiver communicating over a communications media or a communications facility, such as cable, wireless or optical transmission means.

The communicating pair are furnished with a plurality of cryptographic devices for encrypting and decrypting messages exchanged. The cryptographic devices are selected from the group consisting of: (a) plurality of pseudo-random number generators (for generating random keys that are exclusively or'ed with the message); (b) a plurality of elliptic curve cryptosystems; (c) a plurality of discrete-logarithm (RSA) cryptosystems; and, (d) a plurality of so-called symmetric-key cryptosystems.

An Exemplary Method for Establishing a One-Time Cryptographic Pad Between a Communicating Pair Under control of logic in the first transmitter-receiver, a message is prepared to transmit to the second transmitter-receiver. Prior to sending the message, the first transmitter-receiver collaborates to establish a one-time cryptographic pad for encrypting the message to be sent. Collaboration comprises the communicating pair negotiating agreement on a cryptographic device to be used to encrypt and decrypt exchanged messages.

During the process of preparing to transmit and receive messages, the communicating pair engage in a private protocol to establish a connection, choose parameters required to modulate-demodulate signals, and to synchronize communications. During this process, the communicating pair exchange information regarding internal data, as stored in internal data structures, and states that are private and common to the communicating pair and are independent of the content of transmitted messages. Either private internal data or some portion of a previously exchanged message is used by the communicating pair to negotiate a one-time pad. This information, whether a message, part thereof, or private internal data is hereafter called a transmission, to distinguish from messages that are sent in response to a using device of the communicating pair.

Figure 1:
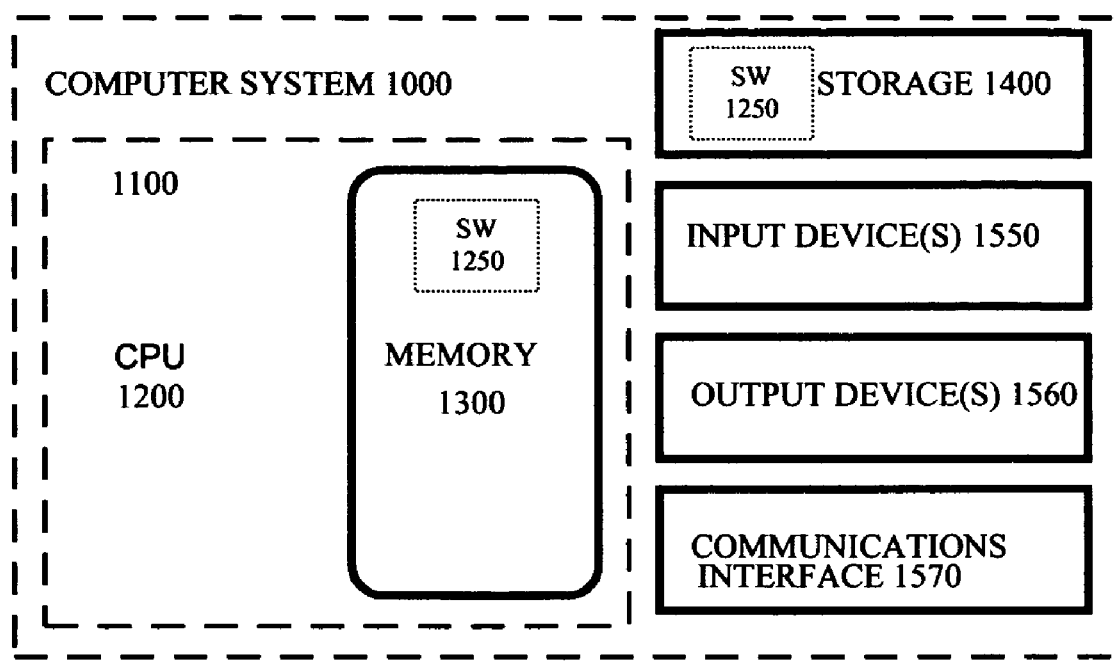
FIG. 1 shows an exemplary environment for implementing a method of the invention.
Figure 2:
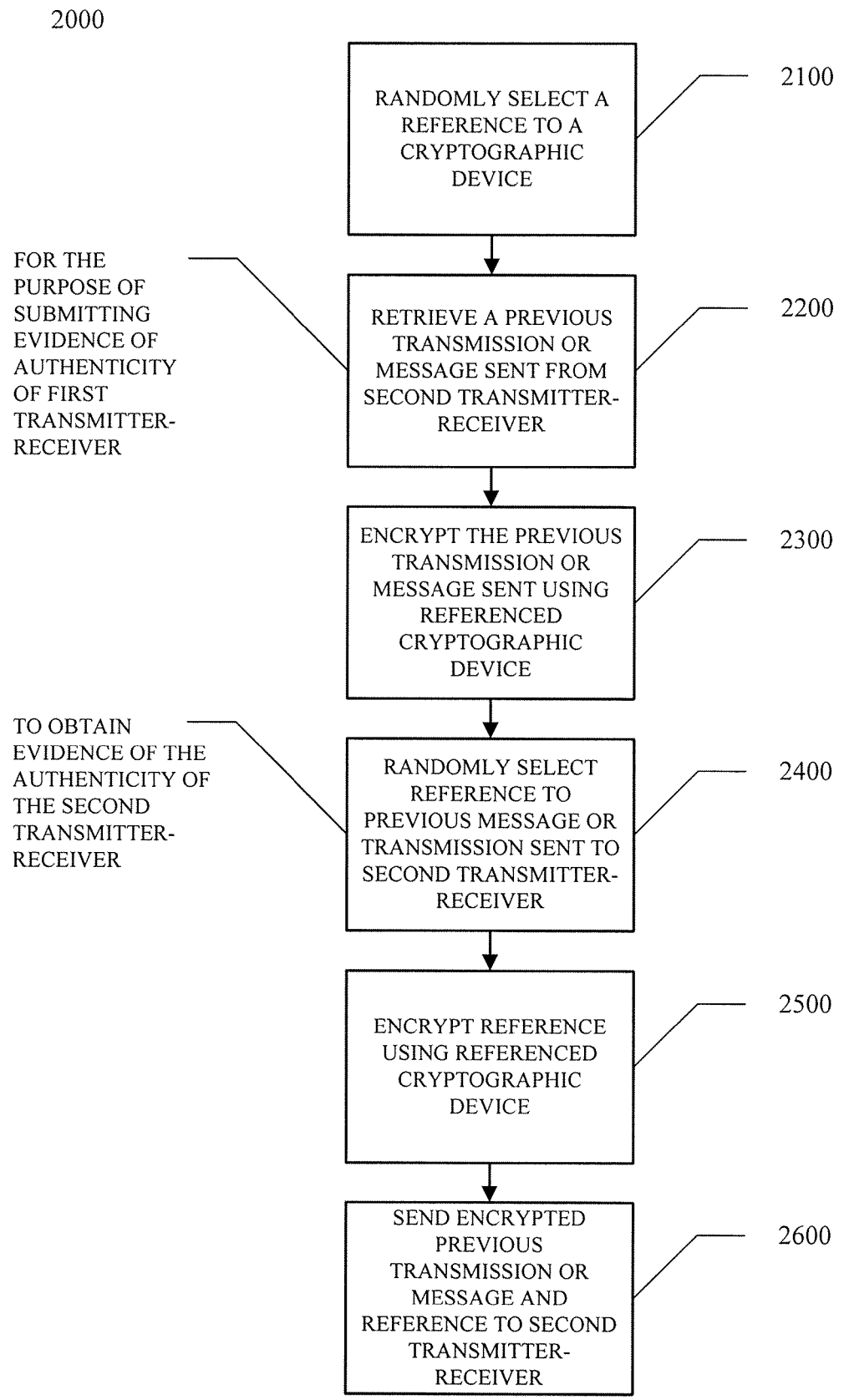
FIG. 2 is a flow diagram of the steps of a method used by a first transmitter-receiver in establishing a one-time cryptographic pad in collaboration with a second transmitter-receiver.

With reference to FIG. 2, the first transmitter-receiver executes the first of a series of steps 2000 to set up the pad. The first transmitter-receiver 2100 randomly selects a reference to one of the plurality of encryption devices. For example, the reference may be a number that designates the cryptographic device, or a pointer to a cryptographic software object having methods called to encrypt and decrypt data. The first transmitter-receiver retrieves a previous transmission received from the second transmitter-receiver 2200, then 2300 encrypts the previously received transmission using the randomly selected encryption device.

It will be appreciated that by sending a previous transmission received from the second transmitter-receiver, the first transmitter-receiver is providing at least some verification of its authenticity with respect to a secure communications channel. Furthermore, the previous transmission is selected from the group consisting of (a) the last message sent by the second transmitter-receiver; (b) a predetermined portion of the last message sent by the second transmitter-receiver; and (c) prespecified internal data that is generated by the communicating pair, that is independent of message content.

The first transmitter-receiver 2400 randomly selects a reference to some previous transmission sent by the first transmitter-receiver to the second transmitter-receiver, and then 2500 encrypts the reference and constructs a message 2600, which is sent to the second transmitter-receiver. The previous transmission in this case is selected from the group consisting of: (a) a previous referenced message sent to the second transmitter-receiver; (b) a predetermined portion of a previous referenced message sent to the second transmitter-receiver; and (c) prespecified internal data that is generated by the communicating pair, that is independent of message content.

Figure 3:
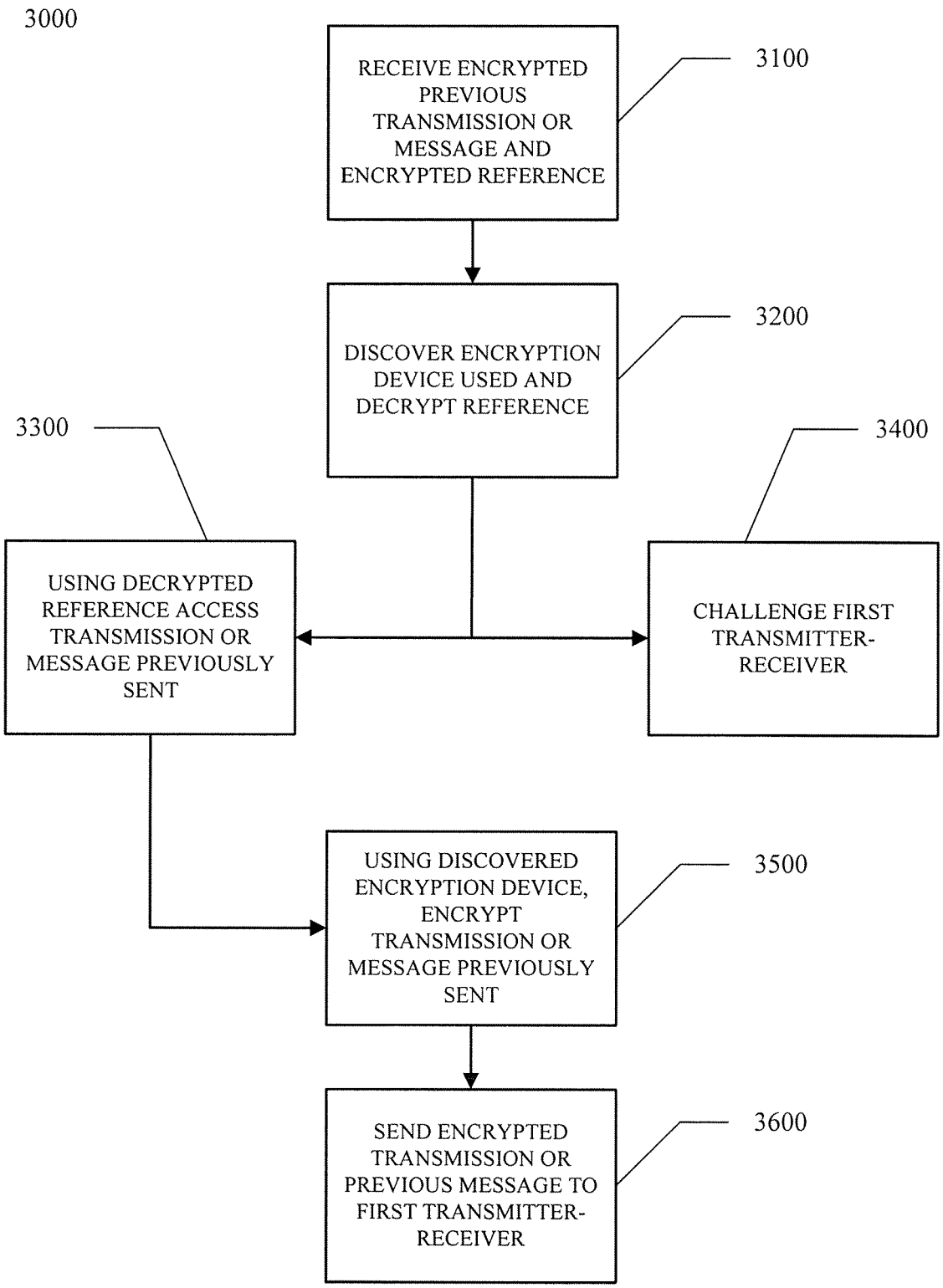
FIG. 3 is a flow diagram of the steps of a method used by the second transmitter-receiver in establishing a one-time pad in collaboration with the first transmitter-receiver.

When the second transmitter-receiver receives the encrypted transmission from the first transmitter-receiver, the second transmitter-receiver executes the steps 3000 shown in FIG. 3.

With reference to FIG. 3000, the second transmitter-receiver 3100 receives the encrypted transmission, and discovers 3200 the cryptographic device used by the first transmitter-receiver. Discovery can be made in several ways, with one example being the second transmitter-receiver sequentially uses all its cryptographic devices, in turn, to decrypt the transmission received from the first transmitter-receiver. The second transmitter-receiver will have identified the cryptographic device used by the first transmitter-receiver when it is able to recover the transmission previously sent by the first transmitter-receiver that is known to second transmitter-receiver. Since the number of cryptographic devices is small in number, for example, less than twenty, the number of computational steps is relatively small to discover the cryptographic device used by the first transmitter-receiver, by sequential trial and error, although other methods are conceivable.

With respect to FIG. 3, 3300 having discovered the cryptographic device used by the first transmitter-receiver, the second transmitter-receiver decrypts the reference to a previous transmission sent by the second transmitter-receiver, and using the reference, accesses the transmission previously sent by the second transmitter-receiver. At this point, the second transmitter-receiver can respond to verify its authenticity by responding with the referenced transmission, or the second transmitter-receiver can respond by challenging the first transmitter-receiver to further provide evidence of its authenticity.

With reference to 3400, if the second transmitter-receiver challenges the first transmitter-receiver, it prepends a code indicating request for further evidence of authenticity and then appends a reference to a previous transmission that the second transmitter-receiver requests to be sent by the first transmitter-receiver. The code and reference are encrypted using the an encryption device randomly selected by the second transmitter-receiver and sent to the first transmitter-receiver. In this case the roles of the first and second communicating pairs are reversed.

If the first transmitter-receiver authenticity is accepted, the second transmitter-receiver 3500 encrypts the previously sent transmission and 3600 sends the encrypted transmission to the first transmitter-receiver.

Figure 4:
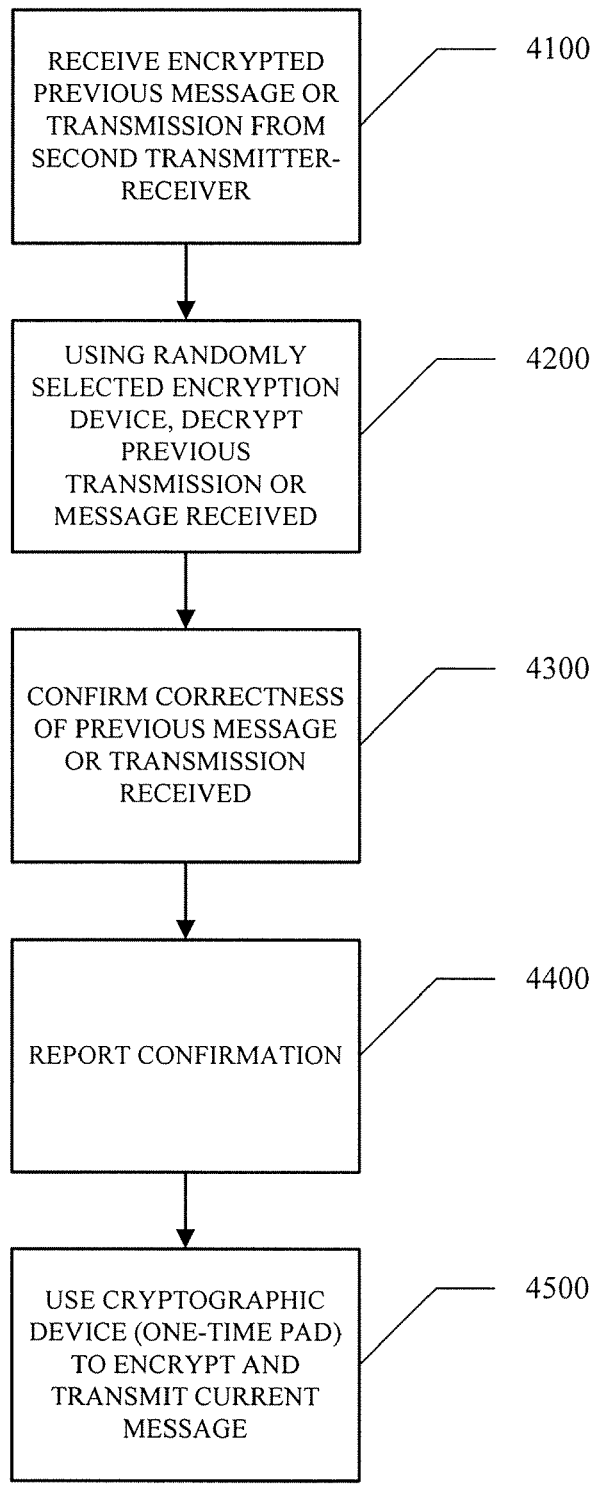
FIG. 4 is a flow diagram of additional steps of a method used by the first transmitter-receiver in establishing a one-time cryptographic pad in collaboration with the second transmitter-receiver.

When the first transmitter-receiver receives the encrypted previous transmission from the second transmitter-receiver, the first transmitter-receiver performs the steps 4000 shown in FIG. 4.

With reference to FIG. 4, 4100 the first transmitter-receiver receives the encrypted transmission from the second transmitter-receiver, then using the encryption device selected by first transmitter-receiver, the transmission previously sent by the second transmitter-receiver is decrypted 4200 and 4300 is confirmed or disconfirmed by the first transmitter-receiver. The state of the confirmation is reported 4400, and if confirmed, the one-time pad, or cryptographic device is used to encrypt and transmit the current message.

An apparatus and method for implementing a one-time cryptographic pad between a communicating pair has been disclosed. It will be appreciated and understood that the invention has been described in exemplary form and that there are numerous variations and changes that will be obvious to one skilled in the art of the field of the invention.

What is claimed is:

1. A method for transmitting an encrypted message from a first transmitter-receiver to a second transmitter-receiver, forming a communicating pair, the method comprising the steps of:

(a) encrypting, by the first transmitter-receiver using a first encryption device, a previous transmission received from the second transmitter-receiver, wherein said first encryption device is selecting randomly from a group consisting of a plurality of pseudo-random number generators, a plurality of elliptic curve cryptosystems, a plurality of discrete-logarithm (RSA) cryptosystems, and a plurality of symmetric-key cryptosystems;

(b) encrypting, by the first transmitter-receiver using said first encryption device, a reference to a previous transmission sent to the second transmitter-receiver;

(c) sending, by the first transmitter-receiver, said encrypted previous transmission and said encrypted reference to the second transmitter-receiver;

(d) receiving, by the second transmitter-receiver, said encrypted previous transmission and said encrypted reference;

(e) discovering, by the second transmitter-receiver, said first encryption device;

(f) decrypting, by the second transmitter-receiver using said first encryption device, said encrypted reference;

(g) decrypting, by the second transmitter-receiver using said first encryption device, said encrypted previous transmission;

(h) accessing, by the second transmitter-receiver, said encrypted previous transmission;

(i) encrypting, by the second transmitter-receiver using said first encryption device, said previous transmission;

(j) sending, by the second transmitter-receiver, said encrypted previous transmission to the first transmitter-receiver;

(k) receiving, by the first transmitter-receiver, said encrypted previous transmission;

(l) decrypting, by the first transmitter-receiver using said first encryption device, said encrypted previous transmission;

(m) confirming, by the first transmitter-receiver, the correctness of said previous transmission;

(n) reporting, by the first transmitter-receiver, confirmation of said previous transmission to the second transmitter-receiver; and (o) encrypting, by the first transmitter-receiver using said first encryption device, a current message.

2. The method according to claim 1 further comprising the steps of:

selecting said previous transmission received from the second transmitter-receiver from a group consisting of a last message sent by the second transmitter-receiver, a predetermined portion of the last message sent by the second transmitter-receiver, and a prespecified internal data that is generated by the communicating pair that is independent of message content.

3. The method according to claim 1 further comprising the steps of:

selecting said previous transmission sent to the second transmitter-receiver from a group consisting of a previous referenced message sent to the second transmitter-receiver, a predetermined portion of a previous referenced message sent to the second transmitter-receiver, and a prespecified internal data that is generated by the communicating pair that is independent of message content.

4. The method according to claim 1 wherein said discovering step (e) further comprises the step of:

using sequentially, by the second transmitter-receiver, each of a plurality of cryptographic devices of the second transmitter-receiver, to attempt to decrypt said reference to a previous transmission sent to the second transmitter-receiver until said reference to a previous transmission is recovered, thus identifying said first encryption device.

5. The method according to claim 4 further comprising the steps of:

after discovering said first encryption device, challenging the first transmitter-receiver by the second transmitter-receiver to further provide evidence of an authenticity of the first transmitter-receiver.

6. The method according to claim 1 further comprising the steps of:

sending, by the first transmitter-receiver, said encrypted current message to the second transmitter-receiver.

7. A method for transmitting an encrypted message from a first transmitter-receiver to a second transmitter-receiver, forming a communicating pair, the method comprising the steps of:

(a) furnishing the communicating pair with a plurality of cryptographic devices for encrypting and decrypting a message to be exchanged between the communicating pair, wherein said plurality of cryptographic devices are a group consisting of a plurality of pseudo-random number generators, a plurality of elliptic curve cryptosystems, a plurality of discrete-logarithm (RSA) cryptosystems, and a plurality of symmetric-key cryptosystems;

(b) collaborating by the first transmitter-receiver with the second transmitter-receiver to establish a one-time cryptographic pad for encrypting said message, said collaborating further comprising:

(b1) exchanging information regarding internal data, as stored in internal data structures, and states that are private and common to the communicating pair and are independent of the content of transmitted messages; and (b2) negotiating an agreement on a cryptographic device from said plurality of cryptographic devices to be used to encrypt and decrypt said message; and (c) preparing, by the first transmitter-receiver, the message for transmission by encrypting said message with said cryptographic device.

8. The method according to claim 7 further comprising the steps of:

sending, by the first transmitter-receiver, said encrypted message to the second transmitter-receiver.

9. A communicating pair system, the system comprising:

a first transmitter-receiver having a first encryption device, wherein said first encryption device is selected from a group consisting of a plurality of pseudo-random number generators, a plurality of elliptic curve cryptosystems, a plurality of discrete-logarithm (RSA) cryptosystems, and a plurality of symmetric-key cryptosystems;

a second transmitter-receiver in communication with said first transmitter-receiver;

a previous transmission received by said first transmitter-receiver from said second transmitter-receiver, wherein said first transmitter-receiver encrypts said previous transmission with said first encryption device; and a reference to a previous transmission sent to said second transmitter-receiver by said first transmitter-receiver, wherein said first transmitter-receiver encrypts said reference to a previous transmission with said first encryption device, and said first transmitter-receiver sends said encrypted previous transmission and said encrypted reference to a previous transmission to said second transmitter-receiver;

wherein said second transmitter-receiver discovers said first encryption device and, utilizing said first encryption device, said second transmitter-receiver decrypts said encrypted reference to a previous transmission and decrypts said encrypted previous transmission, accesses said previous transmission, encrypts said previous transmission with said first encryption device, and sends said encrypted previous transmission to said first transmitter-receiver, where said first transmitter-receiver decrypts said encrypted previous transmission with said first encryption device and confirms the correctness of said previous transmission, reports said confirmation to said second transmitter-receiver, and encrypts a current message with said first encryption device.

10. The system according to claim 9 wherein said previous transmission received by said first transmitter-receiver is selected from a group consisting of a last message sent by the second transmitter-receiver, a predetermined portion of the last message sent by the second transmitter-receiver, and a prespecified internal data that is generated by the communicating pair that is independent of message content.

11. The system according to claim 9 wherein said reference to a previous transmission sent to the second transmitter-receiver is selected from a group consisting of a previous referenced message sent to the second transmitter-receiver, a predetermined portion of a previous referenced message sent to the second transmitter-receiver, and a prespecified internal data that is generated by the communicating pair that is independent of message content.

12. The system according to claim 9 wherein said first transmitter-receiver sends said encrypted current message to said second transmitter-receiver.

* * * * *